Dec. 10, 1946.  L. F. POLK ET AL  2,412,421
GAUGING DEVICE
Filed June 23, 1944  3 Sheets—Sheet 1

INVENTORS
Louis F. Polk and
W. F. Aller
BY Edward T. Noe Jr.
ATTORNEY.

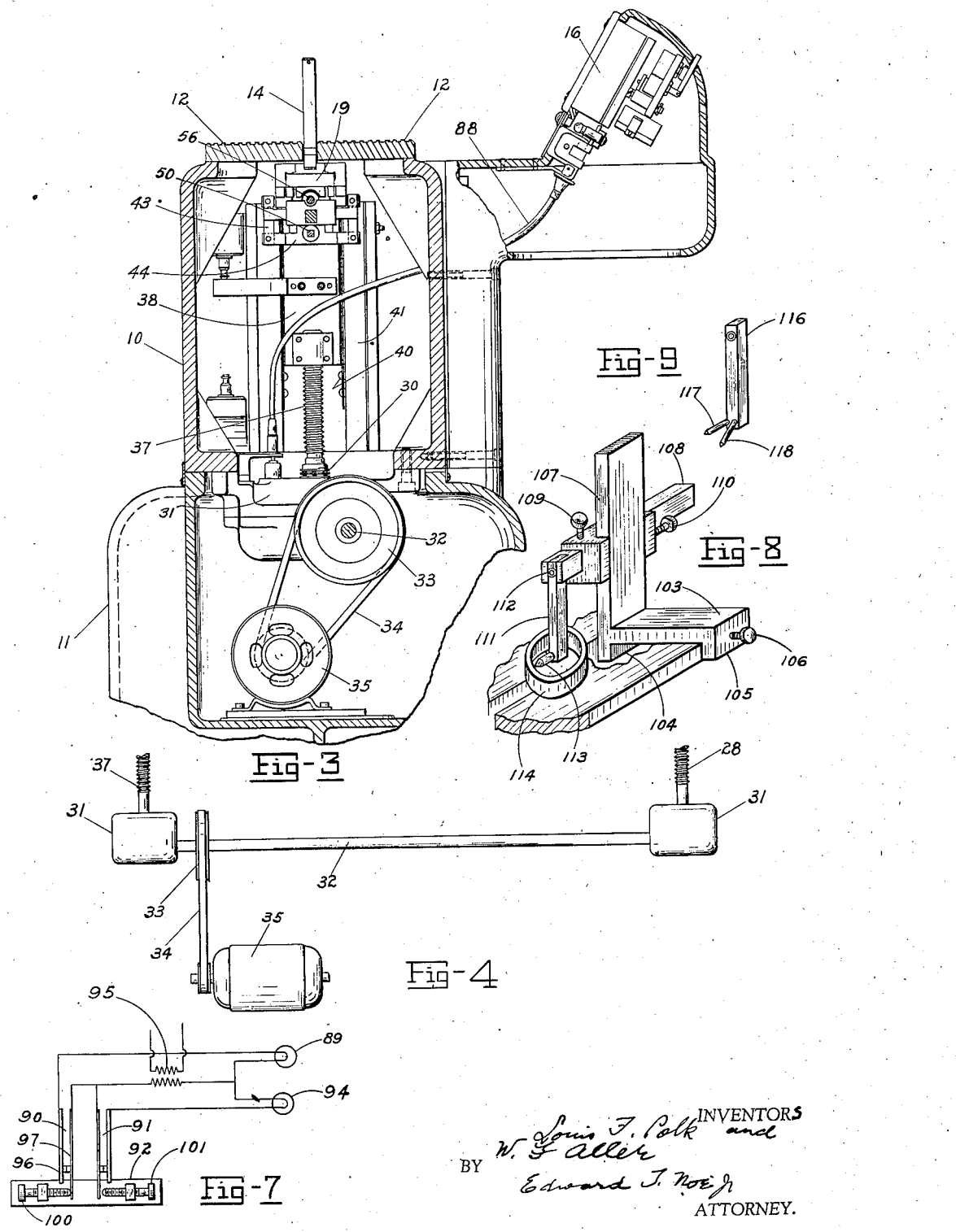

Dec. 10, 1946.  L. F. POLK ET AL  2,412,421
GAUGING DEVICE
Filed June 23, 1944  3 Sheets-Sheet 3

INVENTORS
Louis F. Polk and
W. J. Aller
BY Edward J. Norris
ATTORNEY.

Patented Dec. 10, 1946

2,412,421

UNITED STATES PATENT OFFICE 2,412,421

GAUGING DEVICE

Louis F. Polk and Willis Fay Aller, Dayton, Ohio, assignors to The Sheffield Corporation, Dayton, Ohio, a corporation of Ohio Application June 23, 1944, Serial No. 541,808

14 Claims. (Cl. 33—147)

This invention relates to measuring or gauging apparatus.

One object of the invention is the provision of a gauge having a plurality of relatively adjustable gauging elements adapted for wide range of adjustment and associated with indicating means for gauging or comparing a dimension on a workpiece, the gauging elements being arranged for movement towards and from a stationary work supporting table through which the gauging elements project.

Another object is the provision of a gauge of the character mentioned, the gauging elements being arranged for relative movement towards and from one another on a carrier which is movable towards and from the work supporting table, one of the gauging elements having means operable from one end of the gauge to adjust the gauging element along the carrier and to hold it in adjusted position on the carrier.

Another object is the provision of a gauge having a plurality of relatively adjustable gauging fingers that project through an opening in a work supporting table and arranged for relative movement towards and from the table, spring means being provided for urging one of the fingers either towards or away from the other depending upon the positioning of the spring means, thus adapting the gauge for the measurement of either internal or external dimensions.

Another object is the provision of a gauge having a support which provides a stationary work supporting table, the support enclosing a plurality of elevating screws which are simultaneously operated to raise and lower a carrier on which a pair of gauging elements are carried for relative adjustment.

Another object is the provision of a gauge having a stationary work supporting table and a pair of relatively movable gauging elements that project through an opening in the table and which are both yieldingly carried for simultaneous limited movement in the same direction in which the relative gauging movement takes place, with means for indicating whether or not the two gauging elements are in a normal range of positioning.

Another object is the provision of a gauge having a plurality of relatively movable gauging fingers that project through an opening in a work supporting table and arranged for relative movement towards and from the table and in which both gauging elements are simultaneously and equally movable in a yielding manner between limiting stops, together with means for locating the work with respect to the table, in a gauging operation.

Other objects and advantages of the invention will be apparent from the following description, the appended claims and the accompanying drawings, in which:

Fig. 3 is a section on the line 3—3 of Fig. 1;

Fig. 4 is a detail view showing the drive for the two elevating screws;

Fig. 7 is a detail view showing the connections between the switches and the indicator lamps;

Fig. 8 is a perspective view showing the work positioning means; and

Fig. 9 is a perspective view showing a modified form of work positioning arm.

Figure 1:
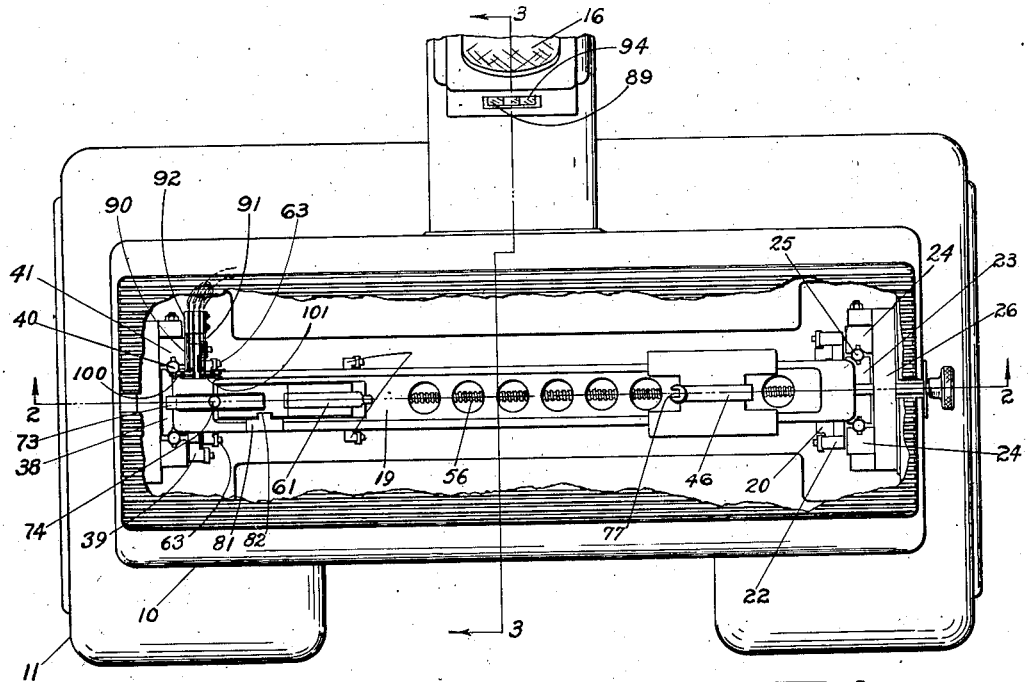
Fig. 1 is a top plan view of a gauge embodying the present invention, a portion of the work supporting table being removed to disclose the parts beneath.

Referring more particularly to the drawings by reference numerals, 10 designates a support, including a base structure 11 having a work supporting table 12 secured thereon by suitable attaching screws engaged in threaded openings 13. The work supporting table is preferably made in two halves with a space or slot between them, the space or slot providing for the reception and movement of a pair of gauging elements or fingers 14 and 15. The gauging elements are relatively movable towards and from one another in a gauging operation and project up above the top of the table so they may contact with a workpiece applied to the table. In the preferred embodiment of the invention, the gauging elements may be arranged to compare or measure an internal diameter or measurement of a workpiece applied to the table, or can measure an external measurement of a workpiece. The relative spacing of the gauging elements is shown on an indicator 16 arranged in a housing portion which projects from or forms a part of the support 10.

Figure 2:
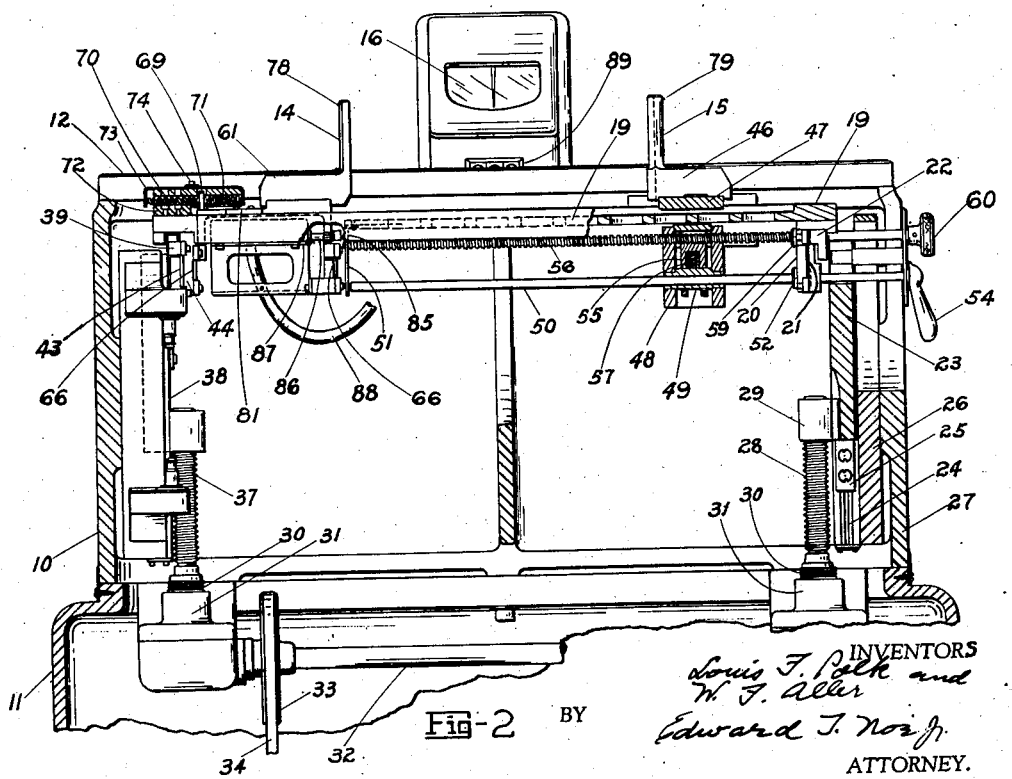
Fig. 2 is a vertical section on the line 2—2 of Fig. 1.

The two gauging elements 14 and 15 are arranged on a carrier 19 which is supported for limited yielding movements towards the right and left as viewed in Fig. 2. The carrier is also adapted to be moved towards or away from the stationary work supporting table 12 so that the extent to which the fingers project up from the table can be adjusted to provide for checking or gauging the size of the workpiece at different points along its length as the workpiece remains on the table. The carrier 19, at the right as shown in Figs. 1 and 2, is provided with downwardly and outwardly extending arms 20 the lower ends of which are rigidly secured to the lower ends of a pair of straight parallel thin spring blades 21. The upper ends of these blades are fixed to a suspension block 22 which is fixed to a carriage 23. The carriage is guided for vertical movement between guideways 24, ball bearings 25 being preferably interposed between the carriage and the guideways. The guideways 24 are secured to an end plate 26 which is held by bolts or other suitable means on the inner side of the end wall 27 of support 10.

The carriage 23, which is illustrated in Fig. 2 near its upper limit of movement, can be moved upwardly or downwardly by an elevating screw 28 the upper end of which is threaded in a nut 29 fixed to the carriage 23. The screw 28 has an antifriction step bearing 30 and is arranged for rotation in a gear housing 31 fixed on the base structure. Suitable drive gearing is arranged in the housing 31 to rotate the screw 28 from a horizontal drive shaft 32 which extends along the base. A drive wheel 33 on this shaft is operated by a belt 34, driven by an electric motor 35 housed in the base, see Fig. 4.

The shaft 32 is also connected to an elevating screw 37 similar to the screw 28, and similarly operated from the shaft, both elevating screws having simultaneous and equal movements. The screw 37 provides for vertical adjustment of the carriage 38 which is guided by means of ball bearings 40 and guideways 41 similar in arrangement to the guide means for carriage 23.

Fixed on the carriage 38 is a suspension block 39. This block is fixed to the upper ends of depending flat parallel spring blades 43. The lower ends of these blades are fixed to outwardly and downwardly extending arms 44 which are rigid with the carrier 19. The spring blades 43 and 21 thus form a suspension carrying opposite ends of the carrier 19 and permitting yielding movement of the carrier in a horizontal direction towards the right or left as viewed in Fig. 2. The yielding movement of the carrier permits the application of some lateral pressure on one or the other of the gauging elements by the workpiece which the operator places on the table 12, the entire gauging apparatus shifting to a limited extent without effect on the indications produced.

The gauging element 15 has a wide range of adjustment towards and from the other gauging element 14, to permit the device to be used for gauging pieces of widely different size. In a gauging operation, the gauging element 15 is fixed to and moves with the carrier 19 to a limited extent, but its position along the length of the carrier can be readily adjusted from a point outside of the gauging mechanism. As will be more apparent from Figs. 1, 2 and 5, the gauging element comprises the upwardly extending finger portion having a horizontally extending tail part 46 which is removably secured by means of suitable attaching screws to a slide 47. The slide 47 operates along and is guided by the opposite sides of the carrier 19, and is rigid with a shell 48 or housing, see Fig. 2. This shell carries a rotatable cam 49 having a rectangular hole through it. A rectangular operating rod 50 passes through this hole and is guided at one end in a plate 51 fixed to the carrier 19 and near its other end it passes slidably through a rectangular hole in a bushing 52 carried by the arm 20 on the carrier. The operating rod 50 extends through vertical slots provided in the upper portion of carriage 23 and in the walls 26 and 27, and extends to a point exterior of the support, where it is provided with an operating hand lever 54. By turning this hand lever the cam 49 can be turned so that the rise on the cam pushes a slidable locking block 55 upwardly into firm contact with an adjusting screw 56 to hold the shell 48 firmly to the adjusting screw. When the operating rod 50 is so turned that the cam rise is lowered out of engagement with the locking block, the latter is held yieldingly by a spring 57 against the lower side of the adjusting screw 56 so that as the adjusting screw is turned, the shell 48 is adjusted towards the right or left as viewed in Fig. 2. The upper side of the locking block forms a half nut which functions either to move the shell 48 and the gauging element 15 when the operating screw is turned, or to lock the shell 48 against the adjusting screw.

The adjusting screw 56 is rotatably supported at one end in the plate 51, and near its other end it is rotatably mounted in a bushing 59 in the arm 20. It extends out past this bushing, through the slots in the upper end of the carriage 23 and the end wall of the support, and is provided with a hand wheel 60 permitting it to be turned by the operator when the locking lever 54 permits. The locking lever 54 is then turned so that the locking lobe on the cam 49 forces the half nut 55 tight against the adjusting screw 56.

Figures 5, 6:
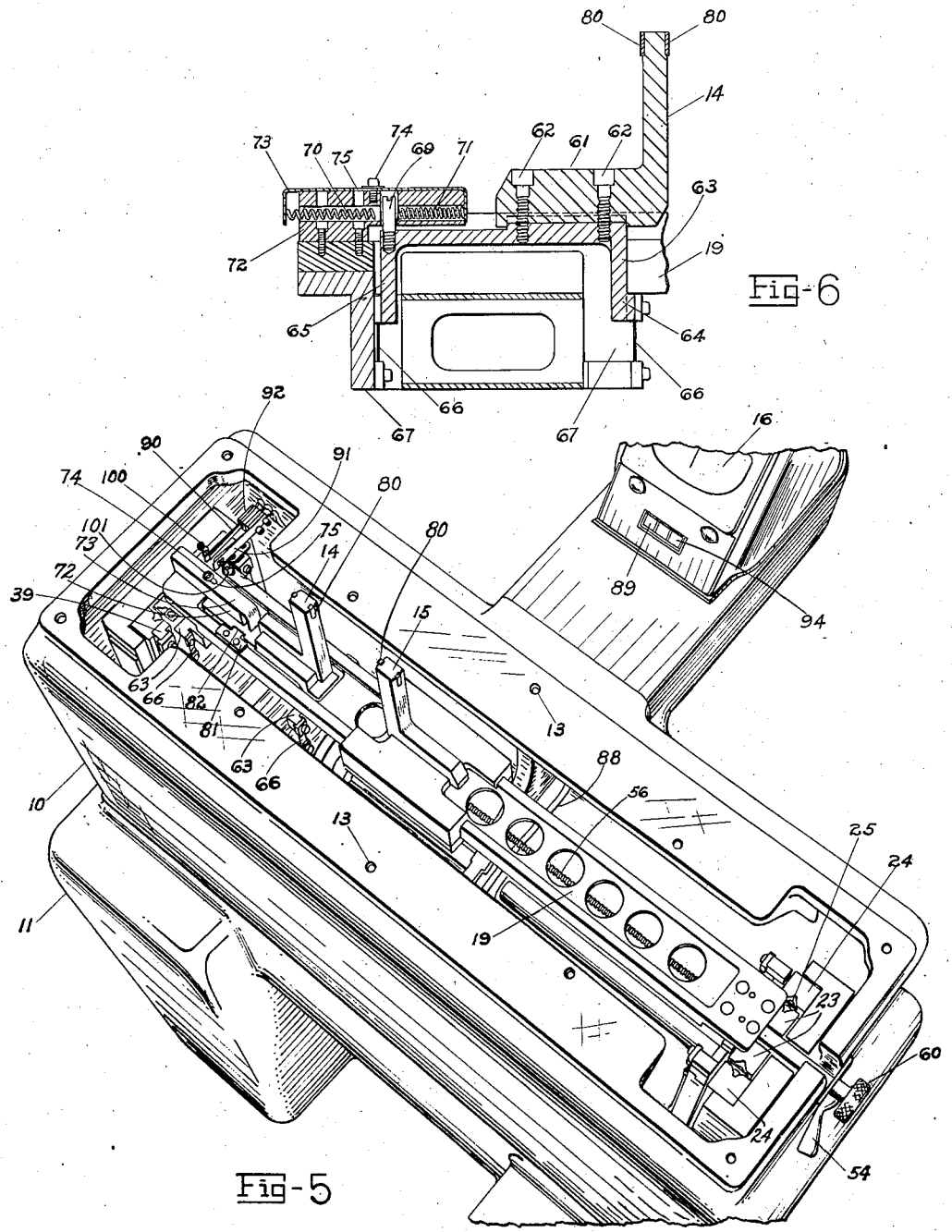
Fig. 5 is a perspective view of the gauge showing the table removed and omitting a portion of the indicator.
Fig. 6 is a vertical central section on an enlarged scale, also on the line 2—2 of Fig. 1, but showing only the movable gauging element and its reversible spring connection.

The gauging element 14 has a tail part 61, see Fig. 6, which is removably secured by means of attaching screws 62 to a spring supported holder 63. The holder is provided with downwardly and outwardly extending arms 64 and 65 and at their lower ends these four arms are secured to the upper ends of four parallel flexible spring blades 66. The lower ends of these springs are fixed to legs 67 which project downwardly and outwardly from the carrier 19. The springs 66 thus carry the movable gauging element 14 for yielding limited movement in a direction towards and from the other gauging element 15.

Spring means are provided for yieldingly urging the movable gauging element 14 in a predetermined direction, and this spring means is so arranged that it can be readily changed to reverse the direction of spring pressure in order to adapt the device to measure either an internal or an external surface on the workpiece. As will be more apparent from Figs. 5 and 6, the holder 63 has a stud 69 arranged between springs 70 and 71. These springs 70 and 71 are provided in horizontal passages in a spring housing 72 which is secured to the carrier 19. A spring cover 73 extends over the top of the spring housing and is down-turned at its opposite ends so as to cover the opposite ends of the springs 70 and 71. The length of the spring cover is somewhat greater than the length of the spring housing so that both springs will not be pressed against the stud 69 at the same time. A screw 74 threaded in the spring housing extends through a slot 75 in the spring cover, the slot being long enough so that when the screw 74 is loosened, the spring cover can be moved endwise, to the position as viewed in Fig. 6 to press against the spring 71 and cause the latter to yieldingly force the pin 69 towards the left. If the spring cover is moved to the right on the spring housing the spring 70 will be pressed against the stud 69 and the spring 71 will be free of the stud, thus forcing the stud yieldingly towards the right. The screw 74 holds the spring cover in either one of these two positions, and since the stud 74 and the spring cover are readily accessible through the slot or passage provided between the two parts of the work supporting table, it is a very simple operation to produce a reversal in the direction in which the gauging element 14 is yieldingly urged with respect to the element 15. If the gauging elements 14 and 15 are intended to gauge an internal passage in a workpiece, the spring cover will be arranged as shown in Fig. 6 so that when the workpiece is applied, it will move the gauging finger or element 14 towards the right from the limiting position in which the spring 71 holds it. For gauging an internal diameter, the construction of the gauging elements is preferably as illustrated in Figs. 1 and 2, the gauging element 15 having a recess or vertical passage 77 large enough to receive the gauging finger of element 14, and the two gauging elements are provided with hardened contact points 78 and 79 on their opposite sides. For gauging an exterior dimension of a workpiece, the gauging elements 14 and 15 may be removed from the holders to which they are screwed, and replaced by gauging elements having work contacting gauging points 80, see Fig. 5. If the gauging elements are intended to gauge dimensions which are considerably in excess of the horizontal dimension of the gauging element 15, the gauging elements may each be provided with gauging contacts on both sides of the same as shown in Fig. 6.

The holder 63 of the movable gauging element and the carrier 19 are so arranged that one of them carries a stop surface and the other carries a housing containing a gauging mechanism which operates the indicator 16, this housing also embodying a spring pressed movable plunger, the end of which is held yieldingly against the stop surface mentioned so that as a relative movement takes place between the gauging element 14 and the carrier 19, from a predetermined position, in either direction, the new position of the gauging element 14 with respect to the carrier is shown by the indicator 16. The indicator is so adjusted that it gives a normal or zero indication when the gauging element 14 is engaged by a workpiece of the desired or standard size.

In the form of the invention illustrated, the stop surface which engages the movable plunger of the housing mentioned is shown at 85 in Fig. 2, positioned on the carrier 19. It is engaged by the plunger 86 which is operably mounted in the housing 87 containing the gauging mechanism, this housing being arranged below the central axis of the carrier but fixed to the holder 63 on which the movable gauging element 14 is fastened. In the housing 87 is a suitable electromagnetic arrangement which need not be explained here, since such arrangements are well known in themselves, so that as the position of the plunger 86 changes with respect to the housing, a change in the electric current passing through the cable 88 obtains. The cable extends to the indicator so that the position of the indicator pointer responds to the relative position of the plunger with respect to the housing 87.

The gauge is also provided with means to indicate whether or not the carrier 19 is in a proper position for gauging or, on the contrary, whether it is pressed too far towards the right or to the left by the workpiece. The indicator 16 is adapted to function properly in a range of movement of the carrier, but if the carrier is held or pressed to a limiting position either to the right or to the left so that a strain might be imposed on some of the parts, an error in reading might result. However, in accordance with the present invention the operator will be aware of this. Indicating lights 89 and 94 are provided below the indicator 16 and are electrically connected to a suitable power source 95 and to switches 90 and 91, as shown in Fig. 7. The two switches are similar in construction, the switch 90, for example, having a rigid blade 96 normally contacting with a flexible blade 97 which tends to press against the contact on the blade 96. The several blades of these switches are supported at one end in a holder 92 which is mounted on the suspension block 39, the latter being movable up and down with the carriage 38. These blades project from their support towards the carrier 19, and the ends of the blades are arranged adjacent stop screws 100 and 101 adjustably mounted on the carrier so as to engage the longer flexible blades of the two switches as will be apparent from Fig. 7. One or the other of these stop screws opens the circuit to one or the other of the lamps 89 and 94 by spreading the corresponding spring blade out of contact with its rigid blade, if the carrier, and thus one of the stop screws, is in an extreme limiting position. If the carrier is floating between its limiting end positions and within a small range of movement in which accurate indications will be obtained, neither of the stop screws 100 or 101 will open the switches, and current will flow through both lamps to show the operator that the reading on the indicator can be relied on.

The extent to which the carrier 63 can move yieldingly on the carrier 19 is limited to some small adequate amount by means of a stop plate 81 fixed on the carrier and projecting into a recess 82 in the side of the holder 63, see Fig. 5. The length of this recess is a little longer than the length of the stop plate 81 to permit freedom of movement in a limited range. The springs 70 and 71 yieldingly urge the holder 63 into engagement with one or the other end of the stop plate 81 when the movable gauging element 14 is not held by a workpiece.

In setting the parts at the start of any gauging operation, a part of known or required size is applied to the gauging elements, the spring cover having been previously moved to the right or left according to the character of the dimension to be gauged, that is, whether or not the workpiece will engage the opposite sides or the adjacent sides of the gauging fingers. The locking lever 54 is removed to release the lock and the hand wheel 60 is turned until the gauging element 15 comes to a position that gives a zero or normal indication on the indicator. The locking lever 54 is then moved to hold the element in its adjusted position on the carrier.

The standard is then removed and the workpiece or a succession of workpieces are applied to the gauging elements. In applying the workpieces, especially if they are heavy, the operator notes whether or not both the lamps 89 and 94 are energized before he notes the reading on the indicator 16, to make sure that the carrier is not held by the work in a limiting position.

While the indicator lights 89 and 94 provide means by which the operator can readily see if the carrier is within its normal range and not in contact with the stop plate 81, the positioning of the work on the work table can be facilitated by a work locating device carried by the table. Fig. 8 shows one form of a work locating device that may be used for this purpose. It comprises a base member 103 having a tongue 104 slidably fitting in the slot or space between the two halves of the table. An end projection 105 overlies the outer edge of the table and a set screw 106 threaded in the projection can be operated to fix the base member in a desired position. The base member carries a post 107 which supports a laterally extending arm 108. This arm is laterally adjustable and also vertically adjustable with respect to the post 107 and can be secured in adjusted positions by means of set screws 109 and 110. On the end of this arm is a bar 111, removably secured by means of a screw 112. The lower end of this bar carries a stud 113 having a work contacting point engageable with the side of the work to be gauged. As herein shown, the work to be gauged is in the form of a ring 114. The work contacting point on the stud 113 is vertically in line with and arranged above one of the work gauging fingers. The parts are so set that when the end of the stud 113 contacts the workpiece and the latter is engaged by the two gauging fingers, the gauging finger fixed on the carrier will be held by the work to arrange the carrier between its limiting positions and out of contact with the fixed stop. The operator can ascertain that such is the case by noting whether or not the lamps 89 and 94 are energized. With the stud 113 arranged above the work engaging finger 14, the latter can be vertically adjusted with respect to the work supporting table until it closely approaches the stud 113. To provide a complete range of movement of the work engaging finger 14 from the bottom to the top of the workpiece, a bar 116 shown in Fig. 9 may be used in place of the bar 111. The bar 116 is provided with two studs 117 and 118 with sufficient space between them to permit the upper end of the gauging finger 14 to be received. The work contacting points on the ends of these two studs 117 and 118 engage the workpieces symmetrically on opposite sides of the work gauging point on the finger 14 and are of assistance in centering the workpiece so that the two work engaging fingers 14 and 15 will measure the true diameter.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauge comprising a carrier, a support for said carrier, a gauging element on said carrier, a second gauging element, means movably supporting said second gauging element on said carrier for yielding movement towards and from the first gauging element, a pair of opposed springs for yieldingly urging said second element in a predetermined direction towards or from the first gauging element, and means readily operable to bring one or the other of said springs into effect to reverse the direction of spring pressure whereby the gauge is adapted for checking either internal or external dimensions.

2. A gauge comprising a carrier, a support for said carrier, a gauging element on said carrier, a second gauging element, means movably supporting said second gauging element on said carrier for yielding movement towards and from the first gauging element, indicating means having parts attached respectively to said carrier and to said second gauging element and responsive to the changes in the relative positions of said gauging elements, a pair of opposed springs for yieldingly urging said second gauging element in a predetermined direction towards or from the first gauging element, and a common means engageable with both of said springs and readily operable to bring one or the other of said springs into effect and simultaneously render one of said springs ineffective to select the direction of spring pressure whereby the gauge is adapted for checking either internal or external dimensions.

3. A gauge comprising a support having a work supporting table, elevating means carried by said support, a carrier operated by said elevating means and movable towards and from said work supporting table, a gauging element on said carrier, threaded means for adjusting the position of said element on said carrier and extending to a point exterior of said support and terminating in an operating handle, a second gauging element, means yieldingly supporting said second element on said carrier for movement towards and from the first element, and indicating means responsive to changes in the relative positions of said elements.

4. A gauge comprising a support having a stationary work supporting table, elevating means carried by said support, a carrier arranged below said table and movable towards and from said table by said elevating means, means for operating said elevating means, a gauging element on said carrier, a second gauging element yieldingly supported by said carrier for movement towards and from the first named gauging element, said gauging elements projecting upwardly from the carrier through the work supporting table.

5. A gauge comprising a support having a stationary work supporting table, a pair of elevating screws carried by said support, means for simultaneously operating said screws, lifting means operated by said screws, a carrier yieldingly supported by said lifting means for horizontal movement below said table, a gauging element on said carrier, a second gauging element, means supporting said second gauging element for yielding movement on said carrier towards and from said first gauging element, indicating means responsive to relative movement of said gauging elements, said gauging elements projecting upwardly through an opening in the table to points above the table to an extent determined by the position of the carrier.

6. A gauge comprising a support having a fixed horizontal work supporting table, elevating means carried by said support, a carrier arranged below said table and movable towards and from said table by said elevating means, means for operating said elevating means, a gauging element on said carrier, a second gauging element yieldingly supported by said carrier for movement towards and from the first named gauging element, said gauging elements projecting upwardly from the carrier through the work supporting table, spring means for urging said second gauging element towards or from the first gauging element, and means readily operable to modify said spring means so that said second gauging element is yieldingly urged in an opposite direction.

7. A gauge comprising a support having a stationary horizontal work supporting table, a pair of elevating screws carried by said support, means for simultaneously operating said screws, a pair of lifting means guided for vertical movement in said support and operated by said screws, a carrier yieldingly supported at opposite ends thereof by said lifting means for horizontal movement below said table, a gauging element on said carrier, a second gauging element, means supporting said second gauging element for yielding movement on said carrier towards and from said first gauging element, indicating means responsive to relative movement of said gauging elements, said gauging elements projecting upwardly through an opening in the table to points above the table to an extent determined by the position of the carrier.

8. A gauge comprising a support having a stationary work supporting table, a pair of elevating screws carried by said support, means for simultaneously operating said screws, lifting means operated by said screws, a carrier yieldingly supported by said lifting means for horizontal movement below said table, a gauging element on said carrier, a second gauging element, means supporting said second gauging element for yielding movement on said carrier towards and from said first gauging element, indicating means responsive to relative movement of said gauging elements, said gauging elements projecting upwardly through an opening in the table to points above the table to an extent determined by the position of the carrier, a pair of opposed springs yieldingly urging said second element in a predetermined direction towards or from said first element, and means readily operable to bring one or the other of said springs into effect to reverse the direction of spring pressure, whereby the gauge is adapted for checking either internal or external dimensions.

9. A gauge comprising a support having a work supporting table, elevating means carried by said support, a carrier carried by said elevating means and movable towards and from said work supporting table, a gauging element on said carrier, threaded means for adjusting the position of said element on said carrier and extending to a point exterior of said support and terminating in an operating handle, locking means extending to a point exterior of said support and terminating in a locking handle operable to fix said threaded means to said element, a second gauging element, means yieldingly supporting said second element on said carrier for movement towards and from the first element, and indicating means responsive to changes in the relative positions of said elements.

10. A gauge comprising a support having a stationary work supporting table, a carrier arranged below said table, a pair of spaced carriages guided for vertical movement in said support, a plurality of flexible spring blades suspending said carrier on said carriages for yielding movement parallel to said table, a plurality of elevating screws mounted in said support for raising and lowering said carriages, common means for operating said screws, a gauging element adjustably mounted on said carrier, means for adjusting said gauging element along said carrier, locking means for holding said element in adjusted position, a second gauging element, means yieldingly supporting said second element on said carrier for yielding movement towards and from said first element, indicating means responsive to changes in the relative position of said second element with respect to said carrier, spring means yieldingly urging said second element towards said first element, and means readily operable to reverse the direction of spring pressure to cause said second element to be yieldingly urged away from said first element.

11. A gauge comprising a support having a stationary work supporting table, a carrier arranged below said table, a pair of spaced carriages guided for vertical movement in said support, a plurality of flexible spring blades suspending said carrier on said carriages for yielding movement parallel to said table, a plurality of elevating screws mounted in said support for raising and lowering said carriages, common means for operating said screws, a gauging element adjustably mounted on said carrier, means extending below said table to a point exterior of said support for adjusting said gauging element along said carrier, locking means for holding said element in adjusted position, said locking means being accessible from the exterior of said support, a second gauging element, means yieldingly supporting said second element on said carrier for yielding movement towards and from said first element, indicating means responsive to changes in the relative position of said second element with respect to said carrier, spring means yieldingly urging said second element towards said first element, and means readily operable to reverse the direction of spring pressure to cause said second element to be yieldingly urged away from said first element.

12. A gauge comprising a carrier, a support providing a work holding table, means yieldingly mounting said carrier on said support for movement in a direction parallel to the table, a gauging element on said carrier, a second gauging element, means movably supporting said second gauging element on said carrier for yielding movement in the said direction and towards and from the first gauging element, indicating means operably interconnected to said carrier and to said second gauging element and responsive to the changes in the relative positions of said gauging elements, and means for indicating when the carrier is in a predetermined range of positioning relative to said support.

13. A gauge comprising a carrier, a support providing a work holding table, means yieldingly mounting said carrier on said support for movement in a direction parallel to the table, a gauging element on said carrier, a second gauging element, means movably supporting said second gauging element on said carrier for yielding movement in the said direction and towards and from the first gauging element, indicating means operably interconnected to said carrier and to said second gauging element and responsive to the changes in the relative positions of said gauging elements, and a work locator adjustably fixed on said table and engageable with the work to position said carrier within a predetermined range of positioning with respect to said table.

14. A gauge comprising a carrier, a support providing a work holding table, means yieldingly mounting said carrier on said support for movement in a direction parallel to the table, a gauging element on said carrier, a second gauging element, means movably supporting said second gauging element on said carrier for yielding movement in the said direction and towards and from the first gauging element, indicating means operably interconnected to said carrier and to said second gauging element and responsive to the changes in the relative positions of said gauging elements, means for indicating when the carrier is in a predetermined range of positioning relative to said support, and work locating means carried by said table and engageable with the work adjacent the point of contact with the work by one of said gauging elements to position said carrier within its said range.

LOUIS F. POLK.
WILLIS FAY ALLER.